April 12, 1932.  H. F. HODGKINS  1,853,354

GEAR LAPPING MACHINE AND METHOD OF LAPPING GEARS

Filed May 22, 1929  2 Sheets-Sheet 1

INVENTOR.
Henry Follett Hodgkins
BY Bodell & Thompson
ATTORNEYS.

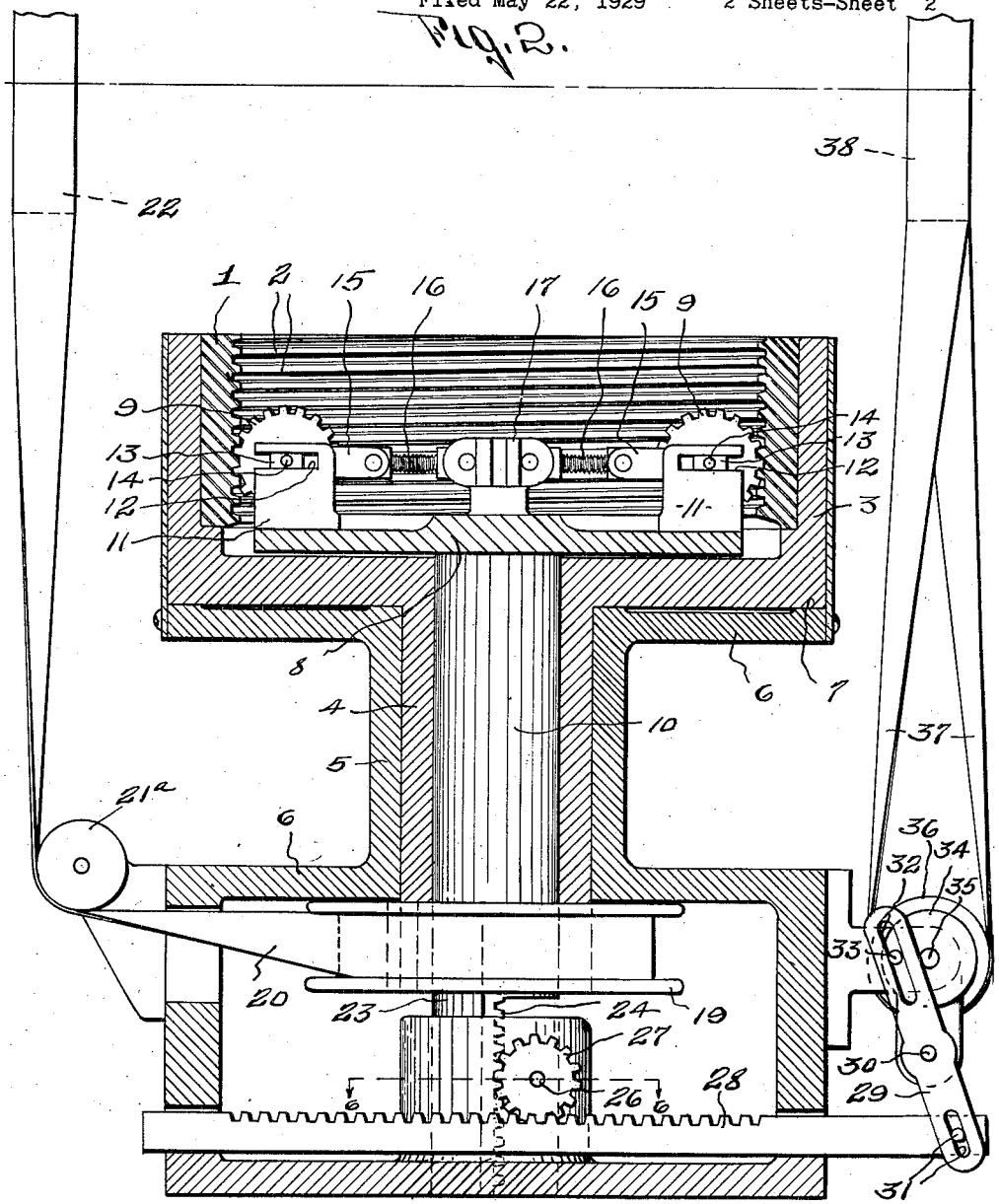

Patented Apr. 12, 1932

1,853,354

UNITED STATES PATENT OFFICE

HENRY FOLLETT HODGKINS, OF SYRACUSE, NEW YORK

GEAR LAPPING MACHINE AND METHOD OF LAPPING GEARS

Application filed May 22, 1929. Serial No. 365,193.

This invention has for its object, a machine for lapping gears to provide the gears with crowned working faces and also, with arc shaped crowns. It also has for its object, a method or process of forming the teeth of gears with crowned working faces and arc shaped crowns and also, the article or gear thus formed, that is, the product of the method or process.

The invention consists in the novel features and in the combinations and constructions in the machine, the method including the use of an internal curved or cylindrically curved toothed lapping surface, and article or gear hereinafter set forth and claimed.

In describing this invention, reference is had to the accompanying drawings in which like characters designate corresponding parts in all the views.

Figure 2 is a vertical sectional view thereof.

Figure 6 is a sectional view taken on line 6—6, Figure 2.

Figure 1:
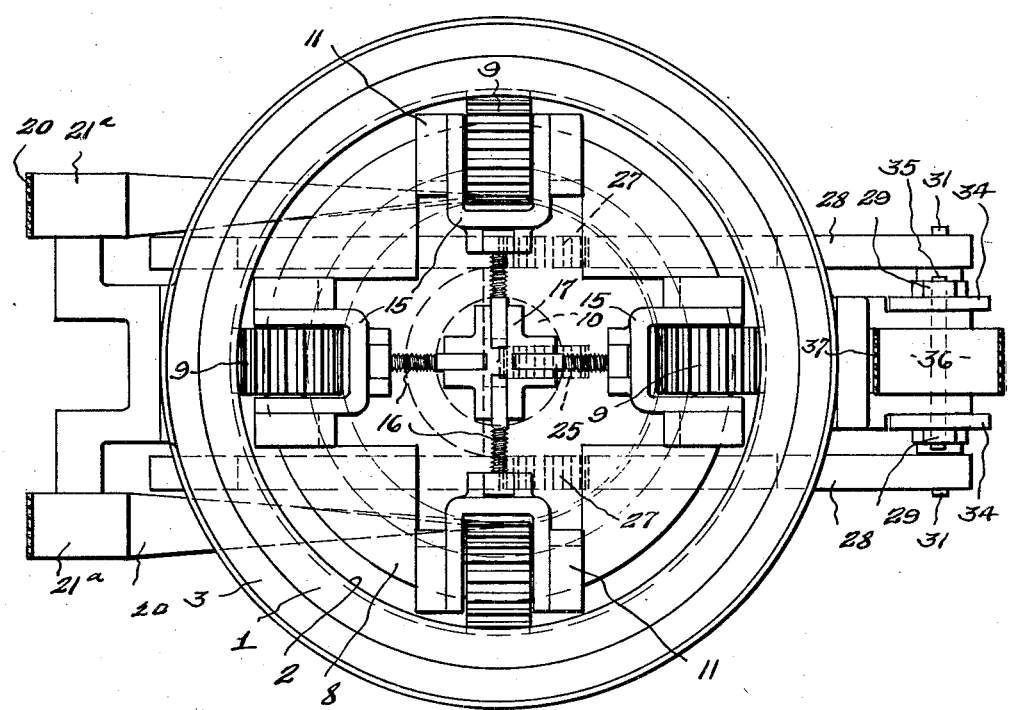
Figure 1 is a plan view of a machine embodying my invention.

The method consists in lapping gears by meshing the teeth thereof with internal teeth on an internal cylindrical or curved or concave surface of a tooth former, while effecting relative movements of the master former and the blank.

The machine may be of any suitable form, size and construction, and in the machine here illustrated, the tooth former is supported to rotate and the work support is stationary, insofar as rotative movement is concerned, but is movable axially of the former to roll the gear blank during the rotation of the master former in a direction crosswise of the internal teeth of the former.

1 designates the master former which is provided with an internal cylindrical face formed with continuous lapping gear teeth 2 extending circumferentially or lengthwise of the cylindrical or curved surface. In the illustrated embodiment of my invention, the internal teeth 2 are spiral. The former is formed of some relatively soft material, preferably aluminum. The former is carried by a suitable support 3 mounted to rotate about an axis, it being here shown as provided with an axial hollow shaft 4 journalled in a bearing 5 in the frame 6 of the machine, the shaft being here illustrated as mounted in vertical position to rotate about an upright axis. The support 3 is provided with suitable thrust bearings at 7 on the frame 6.

8 designates a work support for a plurality of spur gear blanks 9, this work support being mounted in the tooth former support 3 and having a shaft 10 extending through the hollow shaft 4. The work support 8 is provided with one or more gear carriages 11 arranged to hold the gear blanks in mesh with the spiral tooth 2 of the former. These carriages are constructed to receive gear blanks of different diameters and are provided with guide slots 12 for receiving blocks 13 in which the ends of the spindles 14 are mounted, on which the gear blanks are mounted.

The blocks are carried at the ends of forks 15 which are connected to radially extending screws 16 anchored in a suitable block 17 located centrally of the support 3. By turning the screws in any suitable manner, the blocks 13 are movable along the guide slots 12 toward and from the internal face of the tooth former 1 in order to locate gear blanks of different diameters in juxtaposition to the teeth 2 of the former 1, and to permit the varying of the depths of the mesh. The particular construction of the support 8 and the work carriage and the adjustable feature thereof, form no part of this invention. The spindles 14 are located in the chords of arcs of the curve of the inner cylindrical face of the master former, or substantially in said chords. They may be inclined slightly out of the chords, that is, out of the horizontal in the illustrated machine.

The tooth former 1 or the support 3 thereof is actuated in any suitable manner and as here shown, the hollow shaft 4 is provided with a pulley 19 at the lower end thereof within the base of the machine and this pulley 19 is connected to a source of power in any suitable manner as by a belt 20 running over a guide pulley 21ª and over a power pulley 22.

The work support 8 and blank carriages are reciprocated in any suitable manner and as here illustrated the shaft 10 has an extension 23 extending through the pulley 19 and provided with rack teeth 24 with which meshes a gear 25 mounted on a shaft 26 extending transversely of the base of the machine, the shaft 26 having additional gears 27 thereon meshing with racks 28 slidably mounted in the base.

The racks 28 are actuated by levers 29 pivoted at 30 between their ends, each being connected at one end by a pin and slot connection 31 to one end of one rack and its other end is provided with a slot 32 which receives an eccentric or crank pin 33 mounted on a disk 34, the latter being mounted on a shaft 35 having a pulley 36 thereon connected by a belt 37 to any suitable source of power as a drive pulley 38. There is one lever 29 and crank pin 32 for each lever.

Figures 3, 4, 5:
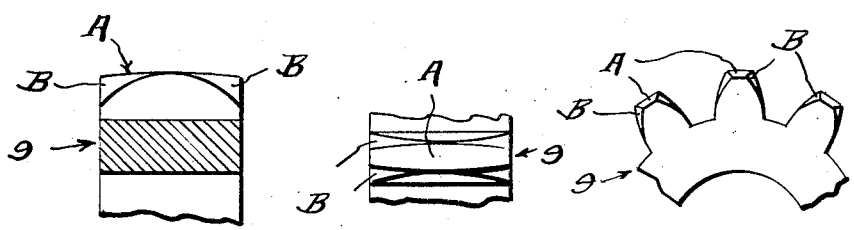
Figure 3 is an enlarged fragmentary elevation of the gear showing the teeth in end view.
Figures 4 and 5 are respectively, a top view and side elevation of one of the gear teeth.

Obviously, during rotation of the shaft 35, the levers 29 will be oscillated by the eccentric pins 32 and impart a reciprocating movement to the racks 28 and the racks through the pinions 27 and 25 will impart a reciprocating movement to the work support 8. By reason of the internal tooth or teeth of the former whether spiral or circular and the relative arrangement thereto of the gear blank, the end faces of the gear teeth will be crowned as illustrated at A, Figures 3, 4 and 5 and also, the side faces will be crowned as illustrated at B.

By tooth gear blank is meant any gear having teeth extending transversely of its periphery, as spur gears or gears with straight teeth, or helical gears, that is, gears in which the spurs or teeth are not straight but helical in contradistinction to a continuous circumferential spiral tooth or teeth.

Gears provided with teeth formed in accordance with my invention when in use, will have a compensating action analogous to a rocking action due to the crowning of the working and the top faces thereof and will hence, correct any slight misalinements and will be efficient and noiseless regardless of inaccuracies and slight misalinements.

What I claim is:

1. A gear lapping machine comprising a rotatable master tooth former having an internal cylindrical working face formed with internal teeth extending circumferentially of its internal face, a work support having means for supporting a toothed gear blank having teeth extending crosswise of its periphery, with said teeth in mesh with the internal teeth of the former with the axis of the gear blank extending crosswise of the axis of the cylindrical working face and means for effecting relative rotative movement of the tooth former and the work support.

2. A gear lapping machine comprising a rotatable master tooth former having an internal cylindrical working face formed with internal teeth extending circumferentially of its internal face, a work support having means for supporting a toothed blank having teeth extending crosswise of its periphery, with said teeth in mesh with the internal teeth of the former, with the axis of the blank extending crosswise of the axis of the cylindrical working face, means for effecting relative rotative movement of the master former and the work support and means for effecting relative movement of the master former and the work support in a direction axially of the master former and crosswise of the teeth of the tooth former.

3. A gear lapping machine comprising a rotatable master tooth former having an internal cylindrical working face formed with continuous teeth extending circumferentially of its working face, a work support having means for supporting a toothed blank having teeth extending crosswise of its periphery, with said teeth in mesh with the internal teeth of the former with the spur teeth extending lengthwise of the teeth of the former and means for effective relative movement of the tooth former and the work support.

4. A machine for lapping gears comprising a rotatable master tooth former having an internal cylindrical working face formed with internal teeth extending circumferentially of the working face, a work support having means for supporting a tooth gear blank in mesh with the internal teeth, with the axis of the blank extending in a direction crosswise of the axis of the cylindrical working face, means for rotating the tooth former and means for effecting relative movement of the tooth former and the carriage in a direction transversely of the teeth of the tooth former.

5. The method for forming the teeth of gears in which the teeth extend crosswise of the periphery of the gear, with crowns are shaped in a direction lengthwise of the gear teeth and with their front and rear working faces crowned in a direction lengthwise of the teeth consisting in lapping the toothed blank on internal circular or spiral teeth.

In testimony whereof, I have hereunto signed my name at Syracuse, in the county of Onondaga and State of New York, this 6th day of May, 1929.

HENRY FOLLETT HODGKINS.